Figure 1:
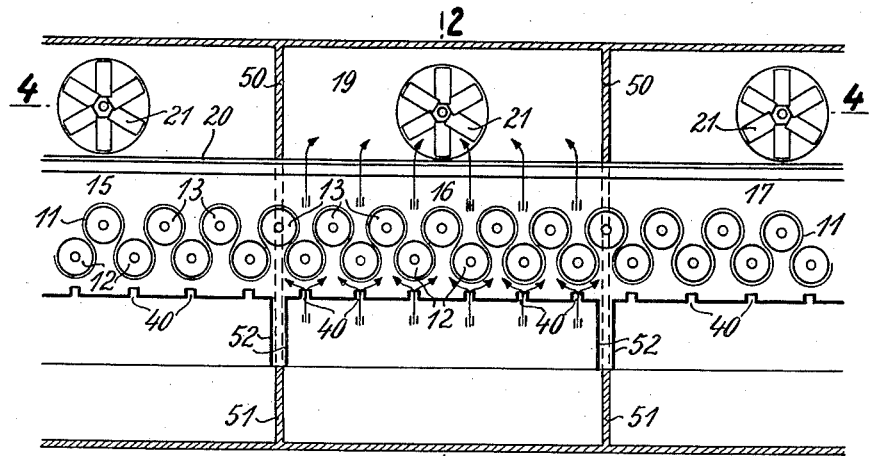

Dec. 13, 1932.  E. BLEIBLER  1,890,568
APPARATUS FOR DRYING WEBS, STRIPS, FILMS, OR SHEETS
AS MANUFACTURED FROM CELLULOSE PRODUCTS
Filed Oct. 23, 1930

Inventor:
Ernst Bleibler,
By Byrnes Townsend & Potter,
Attorneys.

Patented Dec. 13, 1932

1,890,568

UNITED STATES PATENT OFFICE

ERNST BLEIBLER, OF WINTERTHUR, SWITZERLAND, ASSIGNOR TO SYLVANIA INDUSTRIAL CORPORATION, OF FREDERICKSBURG, VIRGINIA, A CORPORATION OF VIRGINIA

APPARATUS FOR DRYING WEBS, STRIPS, FILMS OR SHEETS AS MANUFACTURED FROM CELLULOSE PRODUCTS

Application filed October 23, 1930, Serial No. 490,768, and in Germany October 29, 1929.

My invention relates to an apparatus for drying webs, strips, films or sheets preferably those derived from an aqueous solution of cellulose products, for instance regenerated viscose, in which plant a current of drying or cooling air is passed over the webs within a chamber.

In such drying plants the difficulty arises that the interior of the chamber is not readily accessible, or that access to the several parts of the drying plant interferes with the drying process or with operation of the drying apparatus.

The object of this invention is to render the interior of the drying chambers readily accessible by providing openings for attendance or supervision or for entrance or access to the drying plant, which openings need no closing means while the machine or plant is running.

According to this invention drying plants for strips or films such as those manufactured from cellulose products includes a chamber, means for continuously feeding the strip or film through the chamber, means causing a current of drying air to traverse said strip, and attendance openings in said chamber giving access to the strip being dried, and means including the strip and the chamber to direct the air past the attendance openings in equilibrium with the ambient atmosphere at said openings whereby discharge of the drying air through the openings is avoided.

The attendance openings may extend for the full length of the chamber on each side thereof, the air current being moved in a transverse direction to the chamber boundary at such openings and its pressure (both kinetic and potential) being arranged to be substantially equal to the pressure of the ambient atmosphere.

In the drawing affixed to my specification and forming part thereof a number of embodiments of my invention are illustrated by way of example. It will be readily understood, however, that my invention is by no means limited to these constructions and that the scope of my invention and the ambit of my appended claims extends to any construction incorporating the broad principle underlying my invention.

Figure 2:
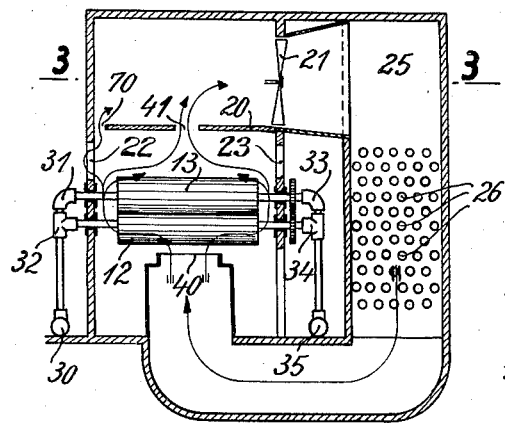
Figure 3:
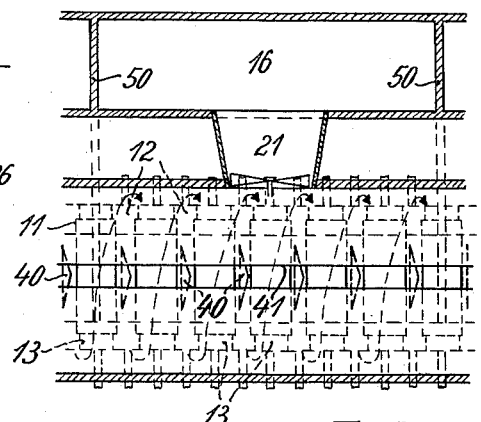
Figure 4:
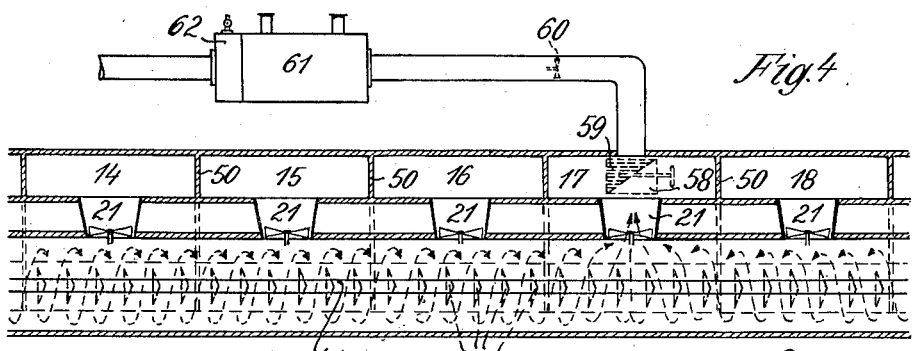

In the drawing:

Fig. 1 is a diagrammatic longitudinal section through a drying plant constructed in accordance with my invention, Fig. 2 a cross-section through the plant shown in Fig. 1 on line 2—2, Fig. 3 is a horizontal cross-section through the plant shown in Fig. 2, on line 3—3 and Fig. 4 is a horizontal cross-section through the plant shown in Fig. 1.

Referring to the drawing, 12, 13 is a system of rollers, drums or cylinders conveying the material to be dried through the apparatus. The plant consists in the embodiment of my invention illustrated of a series of chambers, such as 14, 15, 16, 17, 18 which are subdivided as regards their height by an intermediate ceiling or horizontal partition 20 so that above the intermediate or false ceiling an air conveying space 19 is produced in which air conveyors, such as fans 21, are provided. According to the drying system chosen the air may merely serve for the discharge of the moisture or it may simultaneously serve for heating the web, a suitable heating apparatus 26 being provided at a suitable point of the air conveying path, for instance in the by-pass channel or conduit 25 which conducts the current of air from the conveying room downwards. The rollers or cylinders conveying the material to be dried and being driven in my suitable manner, either by drives of their own or by the forward motion of the goods to be dried, may either be not heated or they may be heated, either by hot air, steam or the like, or be it by discharging a heated liquid, preferably water from distributing pipes 30 at one side of the shaft through pipes 33, 34 to the collecting pipe 35. The air drying the goods is according to another feature of my invention so conducted that this air current heated or to be heated by the rollers flows around the web to be dried from middle to middle in the transverse direction (Fig. 2).

In the illustrated embodiment of my invention to this purpose the air current is introduced below the rollers through slots 40 which extend along the roller approximately to a length corresponding with the width of the web or strip. The discharge of the air current takes place above the rollers through openings 41 provided in the middle of the ceiling of the chamber. By conducting the air in the manner described an extraordinarily uniform treatment of the film over its entire width is obtained. The air issuing from the slots 40 first reaches those parts of the film supported by the rollers 12, as shown in Figs. 1 and 2, and then distributes uniformly over both sides of the film right across its width. Since the film itself stops the direct passage of the air towards the top, the air deviates towards both sides, as indicated by the arrows in Fig. 2. In this way moisture is withdrawn from the film in a uniform manner from the middle towards both sides, while as soon as the air has passed across the rollers sideways it sweeps the surface of the film towards the middle since the discharge of the air takes place above the middle of the roller.

By suitable proportioning the cross-sections as well as the pressure gradient produced by the fan which pressure is on the left-hand side below atmospheric and on the right-hand side above atmospheric, the result is obtained that in such spheres of the drying plant in which attendance through openings 22, 23, from outside is desired, the total, i. e., static and dynamic pressure is substantially equal to the pressure of the surroundings. At the same time the direction of the drying air transverse these spheres is so arranged that the air current is directed transversely or away from the openings, so that by reason of these conditions of substantial equilibrium with the ambient atmosphere there is no tendency of the drying air to leave the chamber and no tendency of the surrounding air to enter the chamber. This condition is assisted by the buoyancy of the wet vapor from the film to be dried. If at these points openings are provided, these may be chosen of sufficient size and may, for instance, extend along the entire length of the drying apparatus as shown in Fig. 2, at 22 or 23 in order to obtain an unrestricted view of the drying process and at any place to enable the film to be attended to, in order to thread the film again into the rollers after a web has broken or to remove the end of a film.

The arrangement according to my invention has the great advantage that the operator attending to the apparatus at the control points works under normal or approximately normal outside conditions. His body is not exposed to the hot vapours and at the same time the hot vapours are prevented from escaping into the atmosphere since by suitably dimensioning the passage cross-sections, pressure conditions and so on, neither a pressure difference is generated towards outside nor strains from the velocity field become operative towards the outside which would cause the current of air to flow outside. The attendance to the drying chamber thus takes place under perfectly normal conditions, although the drying chamber itself can be placed under such temperature and humidity conditions which ensure an economical drying of the material under entirely satisfactory mechanical conditions.

In order to render the action of the drying air sweeping the film from the middle towards the sides as uniform as possible, the drying slots 40 may according to another feature of my invention illustrated in Fig. 3 of the drawing be so shaped that the width of the slot diminishes from the middle towards the sides so that, for instance, the opening has the shape of a flat triangle. In this way there results an increased quantity of air reaching the middle of the film and the drying action is enforced there while the uniform drying of the side portions is attained by the entire quantity of air deviating towards the sides and sweeping over these parts for a longer period of time. By a judicious choice of the opening ratio, of the air velocity, and of the temperatures it may be attained that the drying takes place perfectly uniformly across the entire width of the material and that thus the edges of the film are prevented from drying prematurely and becoming brittle later on during the final drying of the central portions.

As shown in the drawing the drying apparatus is preferably subdivided into individual chambers or sections in each of which an air conveyer 21 produces an independent circulation of air. The individual chambers are in the example illustrated separated from one another partly by fixed walls 50, 51, see in particular Figs. 1, 3 and 4, partly by sheet iron partition 52, which are also provided with the slots 40. The intermediate compartment occupied by the rollers remains free from partitions so that the drying air is at liberty to pass from one chamber section to the next across the rollers.

In order to utilize in a thermotechnically economical manner this passage possibility of the air, an additional pressure drop or head is according to a further feature of my invention produced extending across the length of all sections or a number of sections and which conveys the air across those sections. A chimney or stack 58, Fig. 4, adapted to be controlled by a flap 59 or an additional fan 60 may, for instance, be employed for generating this pressure interval. The heat contained in the air is preferably recovered in a heat recuperator 61, which may be provided with a separator or trap 62 for the condensed water. The arrangement may also be such that the air discharge which, as shown in Fig. 4, takes place from the chamber 17, for instance, is so located that it stands under the control of the pressure side of the fan 21 of the chamber 17 so that this fan apart from feeding the circulation of the chamber 17, also conveys air into the atmosphere. The movement of the air itself is rendered regulable, either by making the fans regulable individually or in groups, or by providing other control devices, such as throttle valves or the like. By these quickly adjustable and regulable air movement it is possible to conduct the drying process in a manner desired at the time. The conditions may be so adjusted i. e. the circulations in the individual chambers may be so tuned in relation to the movement of the air past the chambers that the drying air escapes from the apparatus at a sufficiently high temperature and in a saturated or approximately saturated state. The discharge device of the saturated air will preferably be arranged at that place of the drying plant at which the maximum discharge of the moisture takes place. This is the case when the film strip after passing through a portion of the drying plant has assumed such a temperature that the conditions for discharging moisture are best. In a drying process carried through at moderate roller temperatures such as between 50° and 80° C. and at small temperature gradient of about 10°, that place is located at about a quarter to a third of the length of the dryer train reckoned from the entry of the moist material.

For discharging the air through the roof or ceiling of the chamber individual openings may be provided, but for the sake of simplicity a slot 41 or a plurality of such slots extending along the entire length of the chamber roofs may equally well be provided, inasmuch as the chamber itself is subdivided and in the vicinity of the chamber ceiling the described state of equilibrium in pressure prevails.

In order to make at the same time provisions to prevent that loss currents are generated towards the outside due to the different temperatures existing at both sides of the attendance openings, according to a further feature of my invention additional exhaust openings, such as 70, Fig. 2, are provided in the chamber ceiling at or in the vicinity of the attendance openings by which under the action of the fan 21 the current of air is subjected to an additional suction in the vicinity of the attendance opening so that those losses are also avoided which are liable to be produced by this temperature difference at both sides of the attendance opening. By this arrangement the attendants are also protected against those unfavorable effects which might be produced by temperature flows.

The method and the apparatus according to my invention are particularly valuable for drying those extraordinary sensitive films which in the wet state in which they are fed into the drying apparatus possess an exceedingly low strength and thus require careful watching during the entire process of treatment, prior to drying as well as during the drying, in order to remove all breakdowns at once. Since the drying chambers are now readily accessible without the operators being adversely affected and the drying process can on the one hand be closely watched along its entire course, and on the other hand can be favourably increased or rendered more efficient, merely from the viewpoint of the quality of the material without considering the attendants the further advantage is obtained that the apparatus works extraordinarily favourable as regards economy also. Breakdown caused by the tearing of the web or continuous film strip may be removed at once and now without that considerable loss of good occurring when the attendants cannot enter the drying room immediately. Since the operators now are working under tolerable conditions of temperature and air the removal of the injured parts and the rethreading of the web can take place very quickly and without any substantial losses in time or material. This is particularly valuable in plants which operate continuously from the precipitation of the film from the viscose solution to the winding of the finished material on to the beam.

It will be understood that the invention is not limited to the embodiments described and illustrated by way of example and that various structural changes and modifications may be made without departing from the spirit of my invention, and I desire therefore that the appended claims should be construed in the light of prior knowledge.

I claim as my invention:—

1. Plant for drying strips or films including a chamber, means for feeding the strip or film through the chamber, means for causing a current of drying air to traverse said strip, normally open attendance openings in said chamber giving access to the strip being dried, and means including said strip and said chamber to direct said air past said attendance openings in equilibrium with the ambient atmosphere at said openings to thereby avoid passage of the drying air through said opening.

2. Plant for drying strips or films according to claim 1, wherein said last named means causes the air current to flow transversely across said attendance openings.

3. Plant for drying strips or films according to claim 1, wherein the air current is heated by the feeding means and flows across both upper and lower surfaces of the film to be dried from middle to edge and edge to middle respectively in a transverse direction.

4. Plant for drying strips or films according to claim 1, wherein the feeding means includes a series of rollers and wherein the air current is admitted into the chamber from below the rollers through continuous slots extending along the rollers for a length substantially equal to the width of the film and is discharged above the rollers through openings located in the middle of the chamber ceiling.

5. Plant for drying strips or films as claimed in claim 1, wherein the feeding means includes a series of rollers and wherein the air current is admitted into the chamber from below the rollers through elongated slots extending along the rollers for a length substantially equal to the width of the film and is discharged above the rollers through openings located in the middle of the chamber ceiling, and wherein the width of the slots decreases towards the sides thereof.

6. Plant for drying strips or films as claimed in claim 1, characterized in that the drying way is subdivided into sections, the air current being circulated in said sections by air conveyors and in that an additional pressure interval is generated which extends along the length of at least a pluralty of sections and which at the same time conveys the air along at least a plurality of sections.

7. Plant for drying strips or films according to claim 1, wherein fans are provided in sections of the chamber and are arranged above the ceiling of the chamber.

8. Plant for drying strips or films according to claim 1, wherein the feeding means includes a series of rollers and wherein the air current is admitted into the chamber from below the rollers through slots extending along the rollers at a length apportioned to the width of the film and is discharged above the rollers through openings located in the middle of the chamber ceiling and wherein additional suction openings are arranged in the chamber ceiling at the vicinity of the attendance openings for avoiding air losses which are liable to be caused by the temperature difference at both sides of the attendance openings.

9. Apparatus for drying strips and the like comprising, a chamber, means in said chamber for feeding said strip, a normally open attendance opening in the wall of said chamber and means including said walls for effecting a flow of drying gas past said strip in a direction transversely of said strip, said means being effective to establish a pressure in the interior of said chamber at said opening equal to that of the exterior atmosphere at said opening, and thereby substantially preventing a flow of air in or gas out through said opening.

10. The invention as set forth in claim 9, wherein said last named means includes a partition member in said chamber disposed perpendicular to the direction of flow of said gas and having a perforation adjacent said attendance opening.

In testimony whereof I affix my signature.
ERNST BLEIBLER.